June 17, 1969
K. J. FLEMING
3,450,025
OVEN HAVING ONE HEAT SOURCE FOR PROVIDING BOTH
BAKING AND UNDER-FIRED BROILING
Filed April 4, 1966
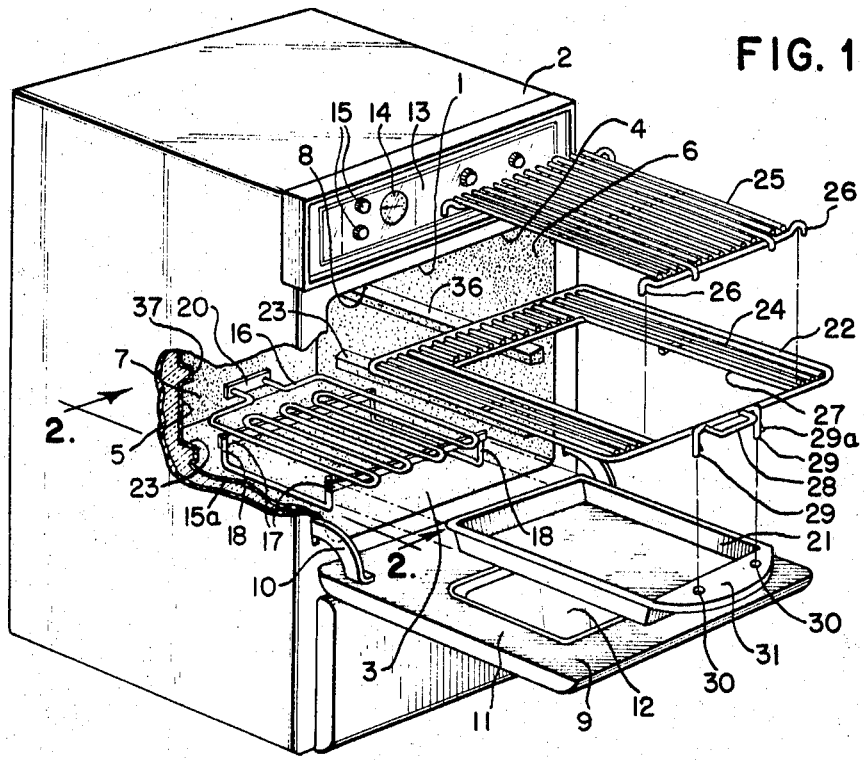
INVENTOR.
Karl J. Fleming
BY
Attorney

United States Patent Office 3,450,025
Patented June 17, 1969

3,450,025
OVEN HAVING ONE HEAT SOURCE FOR PROVIDING BOTH BAKING AND UNDER-FIRED BROILING
Karl J. Fleming, Elmhurst, Ill., assignor to General Electric Company, a corporation of New York
Filed Apr. 4, 1966, Ser. No. 540,171
Int. Cl. F24c 15/00; A47j 37/01
U.S. Cl. 99—399         3 Claims

ABSTRACT OF THE DISCLOSURE

The disclosure describes an oven having the walls thereof coated with polytetrafluoroethylene. A source of heat is situated near the bottom wall of the oven and has the underside thereof coated with a low emissivity material to protect the coating on the oven bottom wall. The oven also includes a drip pan and a slidable rack which are interconnected to effect horizontal movement of the drip pan and rack as a unit.

---

This invention relates to cooking ovens, and more particularly to a cooking oven having a single source of heat which provides for ordinary roasting and baking operations, and also permits under-fired broiling operations to be carried out.

It is an object of my invention to provide an improved cooking oven having a source of heat located at a relatively low level therein for effecting both baking operations and under-fired broiling operations.

A more specific object of my invention is to provide a rack and drip pan structure which accommodate such an under-fired broiling operation, and permit ready movement and removal of the rack and the drip pan, either together or separately, as desired.

Yet a further object of my invention is to provide an oven structure which permits the use on all surfaces of the inside of the oven of synthetic coating materials which enable easy cleaning of the oven compared to the surfaces in use in most ovens at the present time, even where such synthetic materials are not capable of withstanding high temperatures (on the order of 700° F. or more).

Yet a further object of my invention is to provide, in an oven having such a coating material, an electric heating unit which releases the major part of its radiant heat energy directionally upward so as to avoid overheating adjacent portions of the surface.

In one aspect thereof, my invention contemplates provision of an oven having, in the conventional way, top, bottom, back and side walls forming a cooking enclosure having a front opening. The front opening in turn may be closed by an access door hinged on a horizontal axis adjacent its bottom, so that in the horizontal open position the door forms an extension of the bottom wall.

I provide a source of heat in a substantially horizontal plane within the enclosure, and I locate this source in spaced relation to the bottom wall, leaving sufficient vertical space between them to accommodate quite readily the conventional type of drip pan. Above the source of heat, and adjacent thereto, an openwork metal rack is supported for sliding movement. I provide quickly detachable securing means so that the rack and the drip pan may be secured together for horizontal movement as a unit. In this manner, when the rack is pulled out, for instance, to turn over something which is being broiled, the drip pan will come out with it onto the door so as to continue to catch any drippings from the meat being broiled.

Preferably, this securing means forms part of the front of the rack and extends down into lift-off engagement with the drip pan so that horizontal movement of the rack will always cause movement of the drip pan with it, but vertical movement of the rack will disengage the two.

As a further feature of the improved oven, I prefer to use electric heat, a sheathed tubular heater being provided in the horizontal plane mentioned before. This heater has a coating of low emissivity material, such as gold for instance, on its lower side so that by far the major portion of the radiant energy released moves in an upward direction rather than down toward the adjacent surface of the oven. This in turn permits the use of easily cleaned synthetic coating materials, such as polytetrafluoroethylene, over the entire inner surface of the oven. The bottom wall is protected by the low emissivity coating on the heater, and the top wall is protected by the substantial distance which necessarily exists between it and the heater.

The features of my invention which are believed to be novel are set forth with particularity in the appended claims. The invention itself, however, both as to organization and as to method of operation, together with further objects and advantages thereof, may best be understood by reference to the following detailed description taken in conjunction with the accompanying drawing.

In the drawing, FIGURE 1 is a view in perspective, partly broken away, showing the improved oven of my invention;

FIGURE 2 is a view along line 2—2 in FIGURE 1; and
FIGURE 3 is a view along line 3—3 in FIGURE 2.

Referring now to FIGURE 1 of the drawing, there is shown a cooking oven 1 enclosed in a cabinet 2. It will be understood that frequently surface cooking units are provided in conjunction with such cabinets, but they have been omitted here since they are not relevant to the invention. The oven 1 comprises a bottom wall 3, a top wall 4, side walls 5 and 6, and a back wall 7. These walls form a compartment having an opening 8 at the front thereof.

A bottom hinged door 9, mounted to the casing 2 by hinges such as the one shown at 10, is hinged about a horizontal axis adjacent its bottom so that in the vertical position it closes the oven compartment, and in the horizontal position it has its inner surface 11 in the same plane as bottom wall 3 of the oven so as to constitute, in effect, an extension thereof. If so desired, door 9 may incorporate a viewing window 12, as is conventional in the art.

A conventional control panel 13 may be provided in conjunction with the oven. Panel 13 normally includes a timer device 14 and temperature control knobs such as shown at 15.

The inner surfaces 3, 4, 5, 6, 7, and 11 are, in the preferred embodiment shown, coated with a suitable surface finishing material 15a of a type which permits the surface to be cleaned off by merely wiping with a sponge wetted with a water-detergent solution. A number of such materials are available. They have in common the characteristics of being smooth surfaces of synthetic material which are easily cleaned; virtually all such synthetic materials are sensitive to extreme heat, in that temperatures on the order of 700° F. or more tend to make the materials degrade, thereby shortening to a very great extent their useful life. One material particularly suitable for use, and which has already been used in ovens, is polytetrafluoroethylene; and for purposes of discussion of the preferred embodiment, it will be assumed that the coating is made of this particular material, which is well known to withstand almost indefinitely temperatures up to and slightly above 550° F., but which starts to degrade quite rapidly at temperatures around 700°F.

In order to effect the cooking of foods placed in oven 1, a source of heat is provided. In the preferred embodiment this source of heat is in the form of an electric heating unit 16. Unit 16 may be of the conventional sheathed tubular type having a generally sinuous configuration so as to provide a substantial area of heat generation. The heating element 16 is disposed in a substantially horizontal plane, as can be seen, spaced from the bottom wall 3 but adjacent thereto. This may readily be accomplished as shown by mounting heating element 16 on a support including a pair of front and back horizontal members 17, each supported at their ends by U-shaped brackets 18. The length of the vertical legs 19 of the U-shaped brackets determines in effect the height at which the heating element 16 is supported above the level of surface 3.

Heating unit 16 has a terminal assembly 20 which is adapted to engage electrical terminals (not shown) at the back wall 7 of oven 1 so as to permit the heating unit 16 to be connected across a suitable source of electrical energy.

The vertical distance between surface 3 and heating unit 16 is such as to accommodate very comfortably a conventional drip pan 21 of the type conventionally used in oven to catch the grease from items which are being broiled and as a cooking utensil for some roasting and baking operations. In addition, the distance between the two brackets 18 is such as to readily accommodate the width of drip pan 21. Thus, the drip pan is easily positions beneath heating unit 16 and is, in fact, guided into position beneath that unit by the side brackets 18.

An openwork metal rack, generally indicated by the numeral 22, is adapted to be horizontally supported within the oven by any suitable means which, for instance, may be provided by a longitudinal ridge, or projection, 23 formed on the two side surfaces 5 and 6. The side edges of rack 22 rest upon the projections and may be slid along them. It will be observed in FIGURE 2 that the ridges 23 support rack 22 above heating element 16, in closely spaced relation thereto so that a great deal of heat will be received by an article placed on the rack 22.

Conventionally, the rack is formed by providing relatively large diameter outer wires for support, and then connecting the ends of a number of spaced smaller wires to the larger wires. In the preferred embodiment of my invention, I form the rack 22 in two parts, the main part 24 being the one that is supported on ridges 23; a part 25 then, in turn, is supported on part 24. This may readily be achieved by providing part 25 with projections or hooks 26 at each corner thereof. Then, when part 25 is placed over the opening 27 in part 24, hook members 26 will be supported by the wires of part 24 so that part 25 will not move horizontally relative to part 24 but may readily be separated therefrom by being lifted up from it.

Rack 22 has at its forward end a handle 28, and a pair of downwardly extending members 29 which are spaced apart the same distance as a pair of openings 30 in the flange 31 of drip pan 21. When rack 22 is in position on projections 23, the downwardly extending members 29 extend through openings 30, as shown in FIGURE 2. This causes rack 22 and drip pan 21 to slide as a unit when either one is moved horizontally but permits very quick and easy separation of the two simply by a slight upward movement of the front end of rack 22.

It can thus be seen that when the rack 22 is placed on projections 23 so that it is just slightly above the unit 16, an underfired broiling operation may be carried out on any article of food placed on rack 22, and, more specifically, on part 25 thereof. Any grease dripping down from the article being broiled will drop into the pan 21 and this is so regardless of whether the article is actually in the process of being broiled or has been pulled forward for inspection or removal from the oven.

Until such time as the article is removed from rack 22 to be placed on a serving dish or the like, the drippings therefrom will pass into the pan 21 because the rack and the pan move horizontally as a unit. It can readily be seen that, if so desired after the rack 22 has been pulled out to the forward position, with the drip pan 21 sliding across door 9 underneath it, the article which has been broiled may be removed by lifting up part 25 of the rack and carrying it over to a serving dish if so desired rather than lifting the article itself. It will further be observed that the horizontal attitude of rack 22 may be maintained in the forward position by stops 29a on members 29 which limit the downward movement of members 29 through openings 30. Alternatively, of course, conventional embossments (not shown) on the oven walls may be used as is common practice.

Thus, it can readily be seen that an excellent under-fired broiling operation may be carried out in the oven described. It is to be understood that under-fired broiling constitutes a generally preferable means for cooking; the grease or fat which melts during a broiling operation forms on the bottom surface of the article, i.e., the surface adjacent the heat, and therefore drips off the article into the drip pan. This is in contradistinction to the conventional oven broiling operation wherein the source of heat is above the article being cooked: the conventional system causes the melted grease and fat formed during the a broiling operation to puddle on the top surface of the article, and to continued to be cooked with the article.

Referring to FIGURE 3, as a highly desirable additional feature I provide a low-emissivity coating 32 on the lower portion of the sheath 33 of heating unit 16. In this connection, it wil be understood that tubular sheathed heating units include a resistance heating wire 34 which is encased in material 35. Material 35, generally magnesium dioxide, is non-conductive electrically but has a good degree of thermal conductivity. The material 35 and the resistance wire 34 are encased in outer sheath 33 which is formed of an annealed steel alloy having a high degree of emissivity—that is, it emits radiant heat energy to a very high degree. However, the coating 32 is formed of a low emissivity material such as, for instance, silver, gold, platinum or rhodium (with gold being preferred for the application of my invention). Such materials permit the emission of a very limited quantity of radiant heat energy; as a result, the heat energy being released by radiation from heater 16 is directional in nature—it has to travel upwardly since the low emissivity material 32 is covering the lower part thereof.

It will be understood that the covering 32 may be as thin as possible. A thickness of one mil has been found completely practical, and in theory this thickness may be decreased until the covering of low emissivity material is only one molecule thick. The purpose, as stated, is to greatly decrease the radiation downwardly from the heating element 16 and to keep the radiant heat energy directed upwardly. This provides two desired effects. First, the energy is used, as it should be, to cook the article directly above the heating element 16. Secondly, the absence of much heat radiating downwardly prevents overheating of grease caught in pan 21 if the pan is in place, and also prevents an excessive amount of heat energy transfer to the bottom wall 3 of the oven.

Insofar as grease caught in the drip pan is concerned, this is an economical and effective way of preventing the grease from smoking or burning. Insofar as the bottom wall 3 is concerned, it permits a material such as the aforementioned polytetrafluoroethylene to be used despite the proximity of the heating element without excessive heating of the material occurring.

Completing the description of the improved oven of my invention, additional projections 37 may be provided parallel to projections 23 and spaced thereabove so that rack 22 may be placed on projections 36 when a baking or roasting operation is to be carried out, and the heat is not to be so intense. Experimentation has shown that satisfactory cooking results are obtained in this manner.

Thus, in addition to the improved broiling feature, the baking characteristics of the oven are maintained. In addition, it will readily be seen that an oven which is highly economical to manufacture (because it has only a single source of heat) is achieved. Also, the walls may be coated with a suitable, easily-cleaned finish without fear that the temperature in any wall location will be so high as to cause the finish material to degrade.

What I claim as new and desired to secure by Letters Patent of the United States is:

1. An oven comprising:
   (a) top, bottom, back and side walls forming a cooking enclosure having a front opening;
   (b) an access door hinged on a horizontal axis adjacent its bottom, said door having a vertical closed position and a horizontal open position substantially in the plane of said bottom wall;
   (c) a source of heat disposed in a substantially horizontal plane in said enclosure, spaced from and adjacent said bottom wall, and a drip pan provided on the bottom wall beneath the said source of heat;
   (d) an openwork metal rack supported in said enclosure for sliding movement in a horizontal plane above and adjacent said source of heat;
   (e) quickly detachable securing means for connecting said rack to the drip pan to effect horizontal movement of said rack and of the drip pan as a unit, said securing means being rigidly secured to the front of said rack and extending down into lift-off engagement with said drip pan;
   (f) wherein said securing means comprises at least one downwardly vertically extending member, and said drip pan includes a handle portion having at least on opening therein to receive said downwardly extending member when said pan is seated on said bottom wall and said rack is supported in said enclosure above and adjacent said source of heat.

2. The oven defined in claim 1 wherein:
   (a) said source of heat comprises a tubular sheathed electrical resistance heater having a coating of low emissivity covering the lower portion thereof which focuses the major part of its radiant heat energy directionally upward toward the overhead rack on which the food is to be cooked; and
   (b) Wherein a coating of non-stick plastic material having an easily cleaned finish of low food soil adhesion characteristics is provided on at least the bottom, sides and back of said oven, whereby the low emissivity coating protects the non-stick plastic material on the bottom wall of the oven from thermal degradation.

3. A baking and broiling oven comprising:
   (a) a cooking cavity formed by a box-like oven liner and a front-opening access door;
   (b) an oven rack provided in the oven and alternate support means on the opposite side walls of the oven liner for supporting the said rack at various elevations within the oven cavity;
   (c) a coating of non-stick plastic material having a low food soil adhesion characteristic covering the walls forming the oven cooking cavity;
   (d) a metal sheathed electrical resistance heating element located adjacent a bottom wall of the oven, a thin coating of low emissivity material covering the underside of the heating element so as to focus a major part of the radiant heat energy of the heating element upwardly toward the food being cooked within the oven cavity so as to protect the non-stick plastic material on the bottom wall of the oven liner from thermal degradation.

References Cited

UNITED STATES PATENTS

| 1,934,125 | 11/1933 | Hurt | 99—446 |
| 3,052,789 | 9/1962 | Trainor | 219—347 |
| 3,241,545 | 3/1966 | Reinert et al | 126—19 |
| 3,247,383 | 4/1966 | Ulseth et al | 219—347 XR |
| 3,333,530 | 8/1967 | Reuther | 99—339 |

FOREIGN PATENTS 927,999  6/1963  Great Britain.

BILLY J. WILHITE, *Primary Examiner.*

U.S. Cl. X.R.

99—400, 401, 446, 447, 449; 126—337; 219—347; 312—351